US012598549B2

(12) United States Patent
Guo et al.

(10) Patent No.: US 12,598,549 B2
(45) Date of Patent: Apr. 7, 2026

(54) POWER REDUCTION METHOD AND APPARATUS

(71) Applicant: ZTE Corporation, Shenzhen (CN)

(72) Inventors: Qiujin Guo, Shenzhen (CN); Mengzhu Chen, Shenzhen (CN); Bo Dai, Shenzhen (CN); Jun Xu, Shenzhen (CN); Xuan Ma, Shenzhen (CN); Youjun Hu, Shenzhen (CN); Xiaoying Ma, Shenzhen (CN); Hong Tang, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 28 days.

(21) Appl. No.: 18/931,540

(22) Filed: Oct. 30, 2024

(65) Prior Publication Data

US 2025/0056406 A1 Feb. 13, 2025

Related U.S. Application Data

(63) Continuation of application No. PCT/CN2022/112556, filed on Aug. 15, 2022.

(51) Int. Cl.
*H04W 52/02* (2009.01)
*H04W 76/28* (2018.01)

(52) U.S. Cl.
CPC ... *H04W 52/0216* (2013.01); *H04W 52/0206* (2013.01); *H04W 76/28* (2018.02)

(58) Field of Classification Search
CPC . H04W 76/28; H04W 52/0216; H04W 72/23; H04W 16/14; H04W 52/0206; H04W 52/028
See application file for complete search history.

(56) References Cited

U.S. PATENT DOCUMENTS

| | | | | |
|---|---|---|---|---|
| 2013/0258919 A1* | 10/2013 | Damnjanovic | ....... | H04W 52/44 370/311 |
| 2015/0312958 A1 | 10/2015 | Cheng et al. | | |
| 2016/0227428 A1* | 8/2016 | Novlan | ................. | H04W 24/10 |
| 2017/0171907 A1 | 6/2017 | Agarwal et al. | | |
| 2019/0215896 A1 | 7/2019 | Zhou et al. | | |

(Continued)

FOREIGN PATENT DOCUMENTS

| | | |
|---|---|---|
| CN | 104244380 | 12/2014 |
| CN | 107113116 A | 8/2017 |

(Continued)

OTHER PUBLICATIONS

CNIPA, Notice of Allowance for Chinese Application No. 202280095847.5, mailed on Sep. 5, 2025, 10 pages with unofficial English translation.

(Continued)

*Primary Examiner* — Allahyar Kasraian
(74) *Attorney, Agent, or Firm* — Perkins Coie LLP

(57) ABSTRACT

Methods, apparatus, system for wireless communication are described and include a method of wireless communication. A method of wireless communication, comprising receiving, by a communication device, an indication of a discontinuous transmission (DTX) operation by a network node; and operating the communication device according to the indication of the DTX operation.

20 Claims, 11 Drawing Sheets

(56)     References Cited

U.S. PATENT DOCUMENTS

| | | | |
|---|---|---|---|
| 2021/0051589 A1 | 2/2021 | Nam et al. | |
| 2025/0023680 A1* | 1/2025 | Myung | H04W 72/50 |
| 2025/0203649 A1* | 6/2025 | Wu | H04W 52/0235 |
| 2025/0234424 A1* | 7/2025 | Luo | H04W 76/28 |
| 2025/0266946 A1* | 8/2025 | Myung | H04W 72/23 |

FOREIGN PATENT DOCUMENTS

| | | |
|---|---|---|
| CN | 112713968 A | 4/2021 |
| CN | 114642039 A | 6/2022 |
| CN | 116939780 A | 10/2023 |
| WO | 2022/000267 | 1/2022 |
| WO | 2022/080888 | 4/2022 |
| WO | 2022126600 A1 | 6/2022 |
| WO | 2022139492 A1 | 6/2022 |
| WO | 2023/191367 | 10/2023 |

OTHER PUBLICATIONS

Huawei et al., "Physical layer impacts of sidelink DRX," 3GPP TSG RAN WG1 #103-e, E-meeting, R1-2008332, Oct. 26-Nov. 13, 2020, 6 pages.

Extended European Search for co-pending EP Appl. No. 22 955 226.0, Report dated May 26, 2025, 10 pages.

International Search Report and Written Opinion for PCT/CN2022/112556, filed Aug. 15, 2022, Report dated Mar. 22, 2023, 8 pages.

Zte, et al. "Power consumption reduction for physical channels for Nb-IoT" 3GPP TSG RAN WG1 Meeting #90bis R1-1717207, Prague, Czech Republic, Oct. 9-13, 2017, 8 pages.

CNIPA, First Office Action for Chinese Application No. 202280095847.5, mailed on Jun. 13, 2025, 24 pages with unofficial English translation.

* cited by examiner

Network node sends a signaling carrying one or more indication informations to one or more communication devices.
Wherein the indication information is associated with DTX operation.

Communication device detects signaling and determines whether to or not to perform DTX operation based on one ore more indication informations.

1000

POWER REDUCTION METHOD AND APPARATUS

CROSS-REFERENCE TO RELATED APPLICATION

This application is a continuation and claims priority to International Application No. PCT/CN2022/112556, filed on Aug. 15, 2022, the disclosure of which is hereby incorporated by reference herein in its entirety.

TECHNICAL FIELD

This document relates to systems, devices and techniques for wireless communications.

BACKGROUND

In 5G NR, there are some always-on signals that cost power even though these signals are transmitted with a long periodicity, e.g., the maximum periodicity of 160 milliseconds (ms), during micro-sleep TX (transmit, transmission or transmitter) in a low traffic load scenario. In actual implementations, most of the transmission are unnecessary. Therefore, solutions for signal transmission enhancement are needed to achieve lower power consumption.

Currently, 5G devices have been significantly deployed so that the coverage shall be provided by 5G carrier frequency only for both DL (downlink) and UL (uplink). It is observed that the UL coverage of 5G is lack of that of 4G system because the UL carrier frequency of 5G is different from that of 4G. Efficient UL transmission enhancement can also obtain potential energy saving so the solutions for UL coverage enhancement need to be provided as well.

SUMMARY

This document describes technologies, among other things, providing solutions for signal transmission enhancement to achieve lower power consumption.

A method of wireless communication comprising receiving, by a communication device, an indication of a discontinuous transmission (DTX) operation by a network node; and operating the communication device according to the indication of the DTX operation.

In some embodiments, the indication of the DTX operation includes identities of one or more activities that the network node turns off during the DTX operation or a pattern of on duration and off duration of the DTX operation.

In some embodiments, the activities can be periodic or aperiodic.

In some embodiments, when the pattern is an on duration, the communication device is allowed to perform at least one of the following activities: a DL signal/channel transmission, a UL signal/channel transmission, or a cell-specific activity.

In some embodiments, when the pattern is an off duration, the communication device is restricted from performing at least one of the following activities: Synchronization Signal Block (SSB), System Information Block (SIB), paging, periodic CSI-RS, semi-persistent Channel State Information Reference Signal (CSI-RS), Sounding Reference Signal (SRS), Scheduling Request (SR), or uplink (UL) grant, Hybrid Automatic Repeat Request Acknowledgement (HARQ-ACK) feedback, or discontinuous reception (DRX) operations.

In some embodiments, when the pattern is an off duration, the communication device is allowed to perform at least one of the following activities: a behavior triggered by a timer; activities associated with discontinuous reception (DRX), or behaviors comprising messages or feedbacks received by the communication device.

In some embodiments, the behavior triggered by the timer can be performed during a duration that a random access Contention Resolution Timer (ra-ContentionResolutionTimer) or a msgB-ResponseWindow (e.g., msgB-ResponseWindow timer) is running.

In some embodiments, the activities associated with DRX can be the running of a discontinuous reception Retransmission Timer Downlink (drx-RetransmissionTimerDL) timer, a discontinuous reception Retransmission Timer Uplink (drx-RetransmissionTimerUL) timer or a discontinuous reception Retransmission Timer Sidelink (drx-RetransmissionTimerSL) timer.

In some embodiments, the indication of DTX operation includes at least one of the following: the off duration or the availability of the off duration, the on duration or the availability of the on duration, the periodicity or the availability of the periodicity, an offset information, or a delay information.

In some embodiments, the indication of DTX operation is communicated through a signaling, wherein the signaling includes at least one of the following: a Downlink Control Information (DCI), Medium Access Control control element (MAC CE), Radio Resource Control (RRC) signaling, system information block (SIB), an interaction information from another communication device, or an event.

In some embodiments, the Downlink Control Information (DCI) can be at least one of the following: a cell-specific signaling, a group-common signaling, or a user equipment (UE) specific DCI information.

In some embodiments, the DCI indication information is the cell-specific signaling or the group-common signaling, the DCI indication information can be generated in at least one of the following methods: through an information block configured to indicate a cell within a group of cells or device within a group of devices, through an information block configured to indicate a group of cells or devices, or through a bit in a bitmap configured to indicate either a cell or a group of cells, or either a device or a group of devices.

In some embodiments, when the DCI is the group-common signaling or the UE specific DCI, the information field associated with DTX operation in the DCI can be at least one of the followings: an existing field in the indication of the DTX operation, wherein the reusing is triggered by another existing field in the DCI or triggered by higher layer parameters associated with the DTX operation, or a new field in the indication of the DTX operation.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Section headings are used in the present document only to improve readability and do not limit scope of the disclosed embodiments and techniques in each section to only that section. Furthermore, some embodiments are described with reference to Third Generation Partnership Project (3GPP) New Radio (NR) standard ("5G") for ease of understanding and the described technology may be implemented in different wireless system that implement protocols other than the 5G protocol.

Initial Comments

Switch to sleep mode or turn off some RF components when they are not needed are effective methods to reduce network power consumption. For example, if there is no UE access, the carrier can be deactivated. When the traffic load is low, the number of Tx/Rx antennas can be reduced.

However, there are some problems with this energy saving method. Firstly, there are some common signals and necessary transmissions in NR, for example the SSB (Synchronization Signal Block), SIB1 (System Information Block), paging, and PRACH (Physical Random Access Channel) reception. Secondly, even though the UE is configured with DRX, the DRX active time for different UE are hard to be aligned with each other. Therefore, the network cannot easily enter the low power consumption state, e.g., the sleep mode. Thirdly, even if the devices can enter into the sleep states, it is a problem to wake up the devices. If semi-static configuration is used, the devices can be awakened only after sleeping for a period of time. If there is service requirement in sleeping states, it cannot meet the requirement, which will cause great delay and further affect user experience.

Therefore, to reduce power consumption of communication systems, the network should be able to enter the low power consumption state as long as possible. Additionally, a more dynamic energy saving stopping mechanism should be introduced to meet the flexible service requirements and minimize the impact on user experience. Accordingly, UEs can be involved in this procedure to achieve better results.

INTRODUCTION TO EMBODIMENTS

This document discloses at least one DTX operations to achieve power saving without increasing UE power and degrading UE experience.

In this disclosure, the base station (BS) may mean that a communication node, or BTS (Base Transceiver Station) in 2G, or NodeB in 3G, or eNB (E-UTRAN NodeB/enhanced NodeB) in 4G, or gNB in 5G, or a base station of LTE (Long term evolution) or NR (New Radio access technology), or a base station of further generation communication system, or a cell with a normal state or activated state or deactivated state or dormant state, or a cell providing basic coverage, or a cell boosting capacity, or a small cell, or a primary cell, or a secondary cell.

Figure 1:
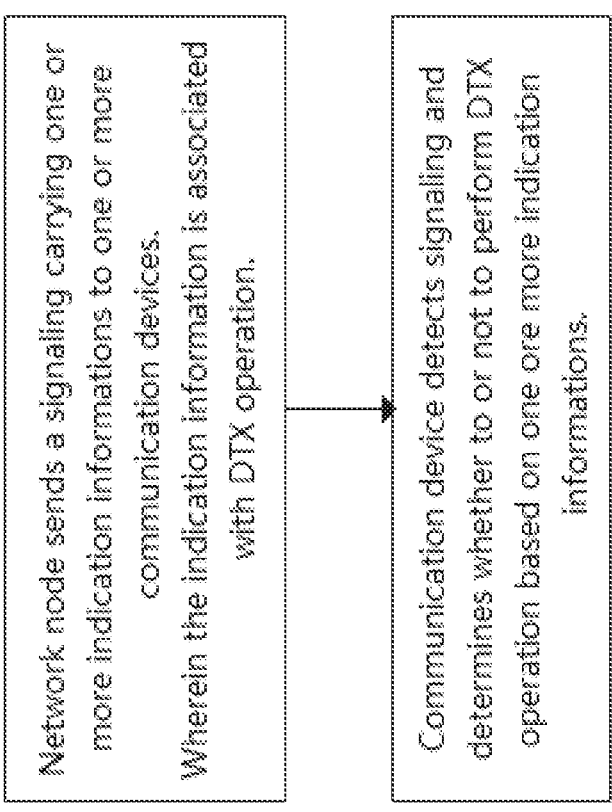
FIG. 1 is an example of a flowchart of the DTX operation.

FIG. 1. discloses a flow chart of an example of the DTX operation. According to FIG. 1, a network node sends a signaling carrying one or more indication information to one or more communication devices. In some embodiments, the indication information is associated with DTX operation. The communication device then detects signaling and determines whether or not to perform DTX operation based on one or more of the indication information.

1) The Pattern for DTX Operation

Figure 2:
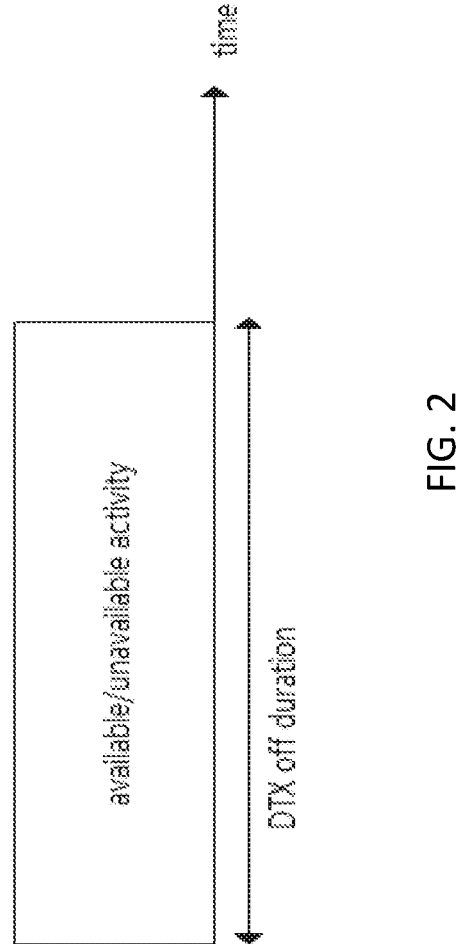
FIG. 2 shows an example of DTX off duration.

The patterns for DTX operation include at least one of the followings:

A) DTX off duration. As shown in FIG. 2, a UE assumes that configurations/activities are unavailable during a DTX off duration. The unavailable or available configurations/activities are introduced in the Embodiments section as shown below.

Figure 3:
FIG. 3 show an example of DTX on duration.

B) DTX on duration. As shown in FIG. 3, a UE assumes that configurations/activities are available during DTX on duration. The available configurations/activities are introduced in the Embodiments section as shown below.

Figure 4:
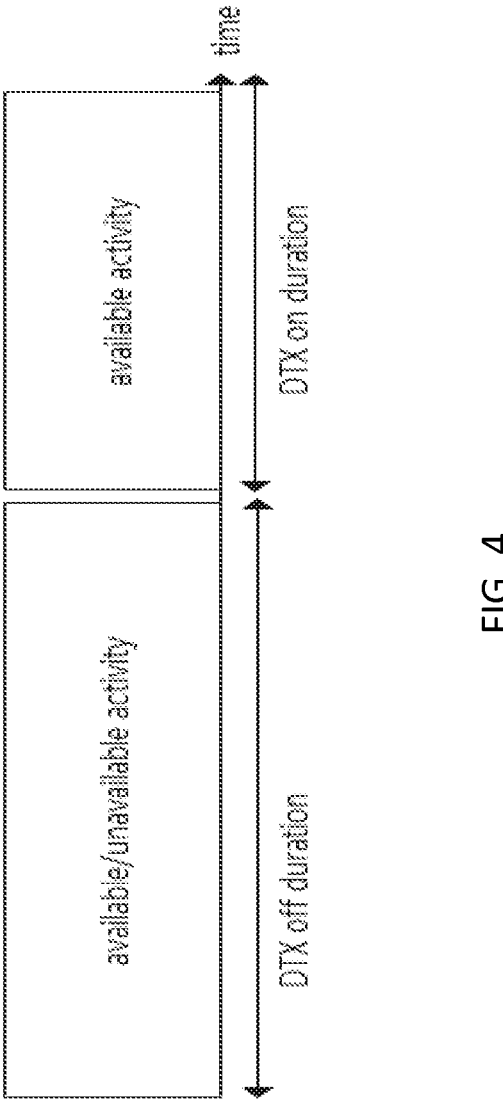
FIG. 4 is an example of DTX pattern with DTX on and DTX off durations.
Figure 5:
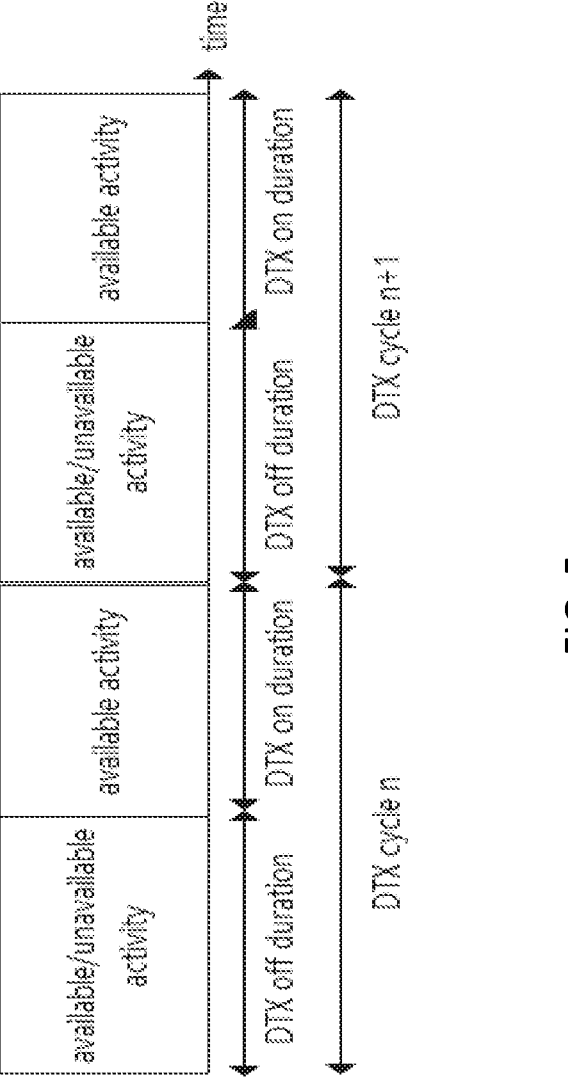
FIG. 5 is an example of DTX periodicity.
Figure 6:
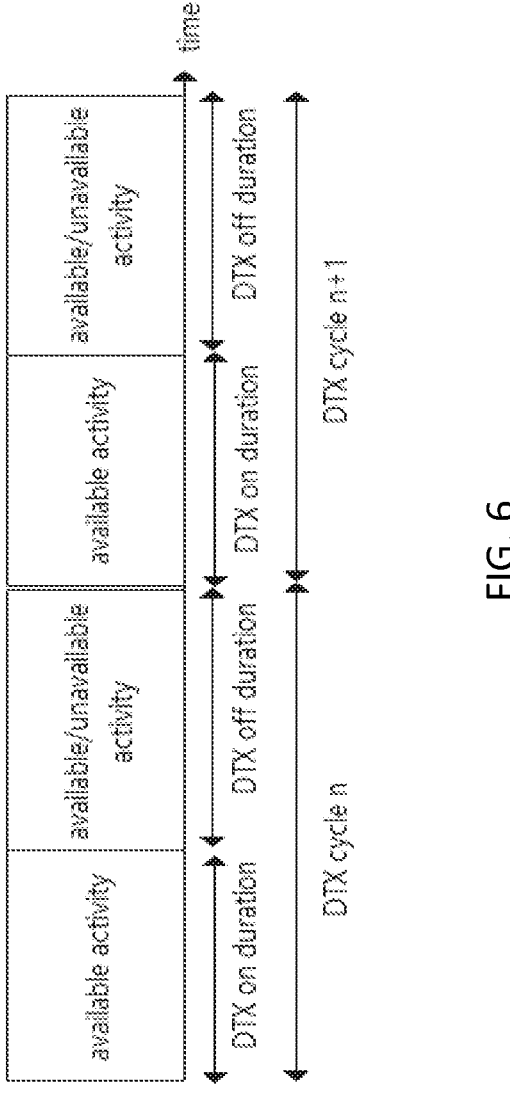
FIG. 6 is an example of DTX periodicity.
Figure 7:
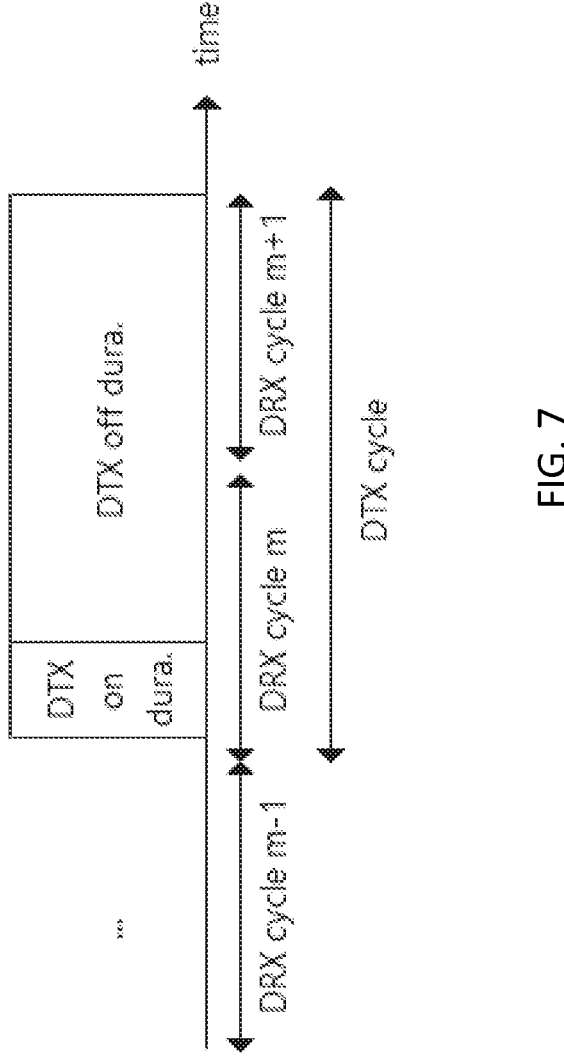
FIG. 7 shows an example of a possible relationship between DTX cycle and DRX cycle.

C) DTX periodicity. As shown in and FIG. 4, a UE assumes that DTX operation is periodically performed during each DTX cycle (i.e. the length of DTX cycle is determined by the DTX periodicity). During a DTX cycle, one or more DTX off durations or DTX on durations can be presented. FIG. 5 and FIG. 6 disclose two examples of DTX cycle patterns.

D) The start position of a DTX off duration, a DTX on duration or a DTX cycle. A UE determines the start position according to an offset or a delay or DTX cycle or DRX periodicity and offset.

Example 1: the start position is after an offset from the beginning of the subframe that is satisfied with [(SFN×10)+subframe number] modulo (DTX cycle)=an offset.

Example 2: the start position is after a delay from the OFDM symbol/slot/subframe that the indication or configuration of DTX operation is received.

Example 3: the start position is after a DRX offset from the beginning of the subframe that is satisfied with [(SFN×10)+subframe number] modulo (DRX cycle)=a DRX offset.

E) Valid time for DTX operation. A valid time for DTX operation is associated with a DTX on duration, a DTX off duration, or a DTX cycle. A valid time for DTX operation can also be a start position or an end position of a DTX off duration, a DTX on duration, a DTX cycle, or a DRX periodicity and offset.

The start position of valid time for DTX operation is set as a start position or an end position of a DTX off duration, a DTX on duration, a DTX cycle, or a start position of a DRX cycle.

Example 1: a UE assumes that one or more DTX on duration is set as the valid time for DTX.

Example 2: a UE assumes that one or more DTX off duration is set as the valid time for DTX.

Example 3: a UE assumes that a combination of one or more DTX on duration and one or more DTX off duration is set as the valid time for DTX.

Example 4: a UE assumes that one or more DTX cycles is set as the valid time for DTX.

F) The configuration of DTX operation. If a UE is provided with the configuration of DTX operation, the UE performs a DTX operation from the start position of a DTX off duration, a DTX on duration, or a DTX cycle.

G) A modification period. A UE detects the indication of DTX operation or the configuration of DTX operation during a modification period.

H) DRX offset. A UE indicated with an offset by a L1 signaling. The offset is used to adjust or determine the start position of a subsequent DRX cycle.

I) A number of DRX cycles. A UE assumes that a number of DRX cycles are used for DTX operation.

Example 1: the length of a DTX cycle, a DTX on duration or a DTX off duration is a multiple of a DRX cycle.

Example 2: the length of a DTX on duration or a DTX off duration is equal to, larger than or is a multiple of either a DRX on duration timer or the sum of drx-onDurationTimer or drx-InactivityTimer or drx-RetransmissionTimerDL or drx-RetransmissionTimerUL or drx-HARQ-RTT-TimerDL or drx-HARQ-RTT-TimerUL.

Example 3: the length of DTX off duration is equal to or larger than or a multiple of DRX cycle minus DRX on duration timer or the sum of drx-onDurationTimer or drx-InactivityTimer or drx-RetransmissionTimerDL or drx-RetransmissionTimerUL or drx-HARQ-RTT-TimerDL or drx-HARQ-RTT-TimerUL.

Example 4: when a UE is provided with DTX configuration, the UE assumes that a DRX operation during a number of DRX cycles are unavailable.

2) Indication Information

The indication information for DTX operation includes at least one of the followings:

DTX off duration or the availability/unavailability of a DTX off duration.

DTX on duration or the availability/unavailability of a DTX on duration.

DTX periodicity or the availability/unavailability of a DTX cycle.

An offset or delay for DTX.

The change of DTX operation.

The configuration of DTX operation.

Valid time for DTX operation.

A start position of a DTX off duration, a DTX on duration, a DTX cycle, or valid time of DTX operation.

The activation/deactivation of DTX operation/DTX on duration/DTX off duration/DTX cycle.

DRX offset.

A number of DRX cycles used for DTX.

Unavailability of DRX operations during one or more DRX cycles.

3) Signaling for Indication Information

In some examples, DTX operation includes DTX off duration or DTX on duration or DTX cycle.

Signaling used for indicating information associated with DTX operation includes at least one of the followings:

A) Cell-specific signaling. A DCI carrying the information for the UEs in a Cell is used to indicate the indication information related to DTX operation. The CRC of cell-specific DCI is scrambled by P-RNTI, SI-RNTI, TC-RNTI, or RA-RNTI.

The information field can be designed through one of the following methods.

i) One information block in a DCI is configured for DTX indication for a cell or a cell group, where the number of blocks is either no larger than the number of cells or cell groups configured by higher layer parameter, or is equal to 1. The starting position of a block is determined by parameters configured by higher layers for one or more cells or cell groups.

ii) A bit in a bitmap field in a DCI is configured for the DL signal transmission indication for a cell or a cell group. The bit width of the bitmap field is 0 bit if higher layer parameter associated with DTX operation is not configured. Otherwise, the N bits of a bitmap is determined according to the number of cells or the number of groups of cells provided by higher layer parameter.

iii) One indication field in a DCI is configured for DTX indication in a cell.

The group of cells are configured by BS. The cells supporting the same eDRX parameters, default paging cycle, or DRX cycle are configured in a cell group. The cells can be SCell, activated SCell, dormant SCell, or PCell.

B) Group-common signaling. The DCI format 2_7 with CRC scrambled by a RNTI, or the DCI format 1_0 with scrambled by P-RNTI, or the DCI format 2_6 with CRC scrambled by PS-RNTI, or the DCI format 2-0, 2-1, 2-2, 2-3, 2-4, 2-5, or a DCI format new to Rel-17 DCI format is used to carry the indication information for DTX operation. The field of indication information is designed as the following:

If an existing Rel-17 DCI format is used to indicate the indication information associated with DTX operation or the higher layer parameters associated with DTX operation is configured for a group of UE, the existing information field(s) or a new information field is used to indicate information associated with DL signal transmission. The existing fields include at least one of the followings:

a) fields of 'Wake-up indication' or 'SCell dormancy indication' in a block in DCI format 2_6 with CRC scrambled by PS-RNTI.

Figure 8:
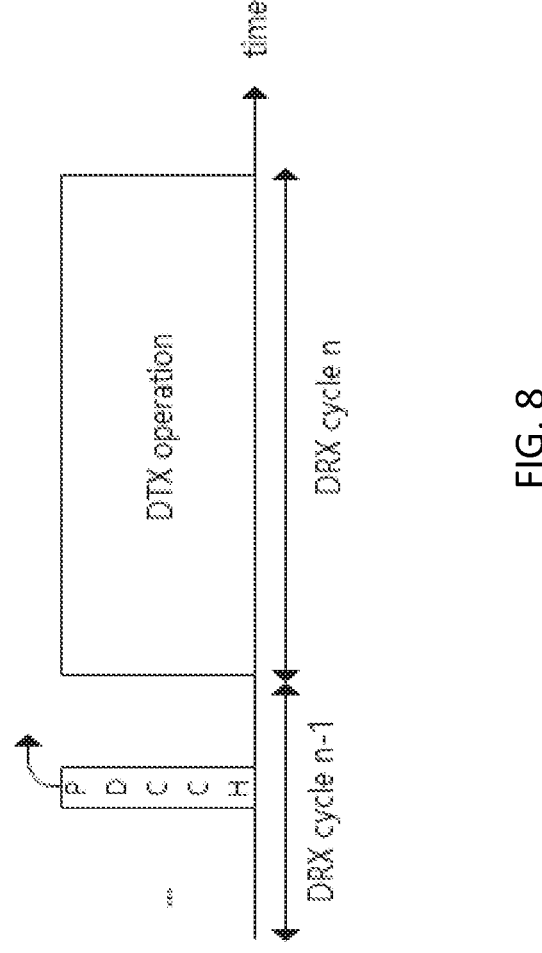
FIG. 8 shows an example of using "wake-up" indication to perform DTX operation.
Figure 9:
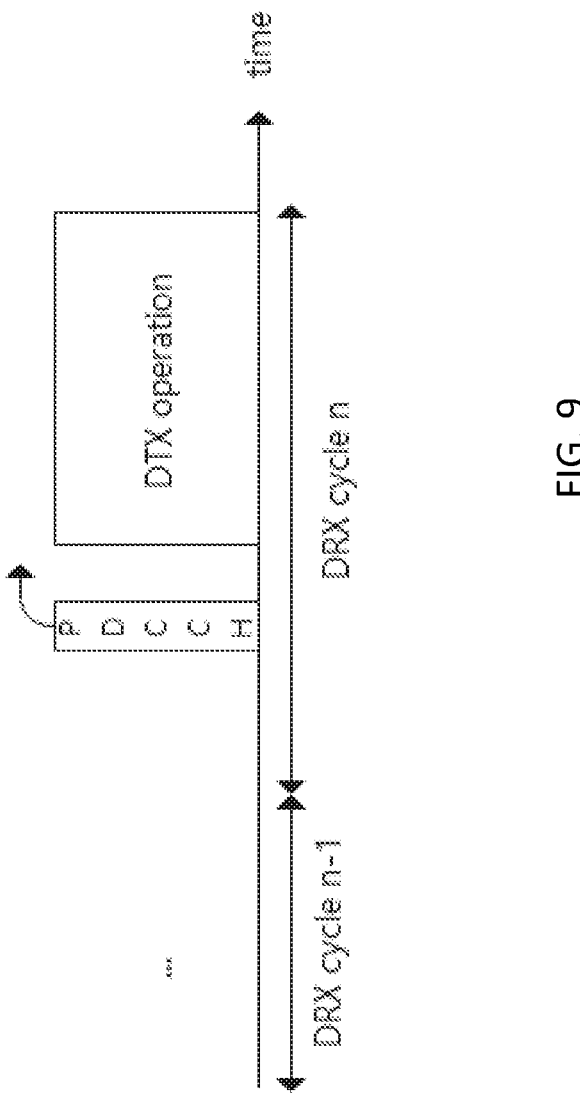
FIG. 9 shows another example of using "wake-up" indication to perform DTX operation.

Example 1: as shown in FIG. 8 and FIG. 9, a 'Wake-up indication' is reinterpreted to indicate a group of UE to perform DTX operation. If a UE is provided by the configuration of DTX operation, the field of 'Wake-up indication' indicates that UE shall perform DTX operation from the beginning of the next DRX cycle as shown in FIG. 8 or after a delay from the detection of the DCI to the end of current DRX cycle as shown in FIG. 9, or UE shall set the current DRX cycle or the next one or more DRX cycle as DTX cycle or the UE assumes that DRX operations during the current DRX cycle or the next one or more DRX cycle are unavailable.

Example 2: each bit of 'SCell dormancy indication' is reinterpreted to indicate a UE or a group of UE to perform DTX operation. If a UE is provided by the configuration of DTX operation, a bit of the bitmap of 'SCell dormancy indication' indicates that a UE or a group of UE shall perform DTX operation from the beginning of the next DRX cycle or set the next one or more DRX cycle as DTX on/off duration or DTX cycle.

b) 'Paging indication' field or 'TRS availability indication' in DCI format 2_7 with CRC scrambled by PEI-RNTI.

Example 1: 'TRS availability indication' is reinterpreted to indicate a UE to perform DTX operation. If a UE is provided by the configuration of DTX operation, the information of the filed indicates that a UE or a group of UE shall perform DTX operation from the beginning of the available validity duration or set the next one or more available validity duration as DTX on/off duration or DTX cycle.

c) the 'Slot format indicator' or 'Available RB set Indicator' or 'COT duration indicator' or 'Search space set group switching flag' in DCI format 2_0 with CRC scrambled by SFI-RNTI.

d) 'Pre-emption indication' in DCI format 2_1 with CRC scrambled by INT-RNTI.

e) Fields in DCI format 2_2 with CRC scrambled by TPC-PUSCH-RNTI or TPC-PUCCH-RNTI or DCI format 2_3 with CRC scrambled by TPC-SRS-RNTI, or DCI format 2_4 with CRC scrambled by CI-RNTI, or DCI format 2_5 with CRC scrambled by AI-RNTI.

The UE group is based on at least one of the following:

the UE identity of the UE in a group configured for DCI format 2-6 or DCI format 2-7;

a number of group of UE is configured by higher layer parameters;

the UE with the valid PO in a same PF or in a number of sequential PF during a eDRX cycle or a default paging cycle is configured as a UE group.

The information field in the DCI indicates one or more UEs according to the following methods:

One information block in a DCI is configured for a UE in the UE group.

One information block in a DCI is configured for a group of UE.

A bit in a bitmap in a DCI is configured for a UE or a group of UEs.

C) UE-specific DCI. The existing DCI format 0-1 or DCI format 0-2, or DCI format 1-1 or DCI format 1-2 or a new DCI is used to carry the indication information for DTX operation.

In one scenario, one indication field in a DCI is configured for DTX indication for the UE. The indication field can be a bitmap to indicate the availability of DTX operation or one or more DTX on durations or DTX off durations or DTX cycles. If UE is configured with DRX and is provided by the configuration of DTX, some examples are provided below.

Example 1: the information of the field indicates the UE to perform DTX operation after a delay from the detection of the DCI to the end of current DRX cycle as shown in FIG. 9.

Example 2: the information of the field indicates the UE to perform DTX operation during the next DRX cycle as shown in FIG. 8.

In another scenario, an existing information field is used to indicate the indication information related to DTX operation. The existing information field may include:

The field of 'Frequency domain resource assignment', 'Time domain resource assignment', 'Modulation and coding scheme', 'New data indicator', 'Redundancy version', 'HARQ process number', or 'UL/SUL indicator' in DCI format 0_0 with CRC scrambled by C-RNTI or CS-RNTI or MCS-C-RNTI.

'HARQ-ACK bitmap' or 'All the remaining bits' used for indicating CG-DFI, 'Frequency domain resource assignment', 'Time domain resource assignment', 'Modulation and coding scheme', 'New data indicator', 'Redundancy version', 'HARQ process number', or 'UL/SUL indicator' in DCI format 0_1 with CRC scrambled by C-RNTI or CS-RNTI or SP-CSI-RNTI or MCS-C-RNTI.

'Frequency domain resource assignment', 'Time domain resource assignment', 'Modulation and coding scheme', 'New data indicator', 'Redundancy version', 'HARQ process number', or 'UL/SUL indicator' in DCI format 0_2 with CRC scrambled by C-RNTI or CS-RNTI or SP-CSI-RNTI or MCS-C-RNTI.

'Random Access Preamble index', 'UL/SUL indicator', 'SS/PBCH index', 'PRACH Mask index', 'Reserved bits', 'Time domain resource assignment', 'Modulation and coding scheme', 'New data indicator', 'Redundancy version', 'HARQ process number', 'Downlink assignment index', 'PUCCH resource indicator', 'Short Messages' or 'TRS availability indication' in DCI format 1_0 with CRC scrambled by C-RNTI or CS-RNTI or MCS-C-RNTI.

'Frequency domain resource assignment', 'Time domain resource assignment', 'Modulation and coding scheme' for transport block 1, 'New data indicator' for transport block 1, 'Redundancy version' for transport block 1, 'HARQ process number', 'PDSCH group index', or 'HARQ-ACK retransmission indicator', or 'SCell dormancy indication' in DCI format 1_1 or DCI format 1_2 with CRC scrambled by C-RNTI or CS-RNTI or MCS-C-RNTI.

D) MAC CE. MAC CE is used to indicate the indication information. For example, information including activation/start of DTX operation or the deactivation/stop of DTX operation or the change of DTX operation.

E) RRC signaling. The parameters for DTX operation include at least one of the followings:

The indication information for DTX operation mentioned above.

The parameters of DTX operation configured for a cell or a group of cell.

The parameters of DTX operation configured for a UE or a group of UE.

F) SIB. If the UE is configured with supporting DTX operation, the UE shall acquire SIB information during the valid modification period. The UE assumes that the modification period for SIB acquisition is the modification period n after the modification period n−1 that the indication of SI change was received or is the modification period according to the mechanisms specified in NR Rel-17. Wherein the DTX operation during the modification period n+1 is available for the UE if the information carried by SIB indicates the start or available of DTX operation. If the SIB acquired by UE does not carry the indication information for DTX operation, UE assumes that the DTX operation is stopped or is not started or is unavailable.

G) BS interaction. If the UE is configured with supporting DTX operation, the information associated with the DTX operation is interacted among BS and other peer BSs or neighbor BSs. The interaction information includes at least one of the followings:

Whether DTX operation is supported by a Serving Cell or not can be interacted among wireless communication nodes through Xn interface.

Whether DTX operation is supported by a group of UE or not can be interacted among wireless communication nodes through Xn interface.

Xn interface supports the exchange of signaling information between two NG-RAN nodes, and the forwarding of PDUs to the respective tunnel endpoints.

H) Events. If the UE is configured with DTX operation, the DTX operation is triggered by an event. The event includes at least one of the followings:

i) Events on BS side triggering DTX operation include at least one of the followings:

BS receives request for DTX operation sent by UE.

BS receives the acknowledgement information for DTX operation configuration by a number of UE. wherein the number of UE is not smaller than 1 or is larger than a threshold; the threshold is equal to a multiple of the number of idle-mode UEs or connected-mode UEs in a cell; wherein the multiple is a fraction and is larger than 0.

The value of RSRP/RSRQ reported by one or more UEs is lower than a threshold.

The load percent is smaller than a threshold.

The DL or UL data volume is smaller than a threshold.

ii) Events on UE side triggering DTX operation include at least one of the followings:

UE reports the acknowledgement for DTX operation configuration.

UE's DL transmission is restricted on a serving cell.

only UL or DL CC(s) is configured for UE.

A UE is configured with DRX operation.

UE does not need to perform PDCCH monitoring for a duration.

measurement results based on SSB or CSI-RS or TRS or PTRS or PRS resource are smaller than a threshold.

measurement results of RSRP/RSRQ are smaller than a threshold;

The associated SSB and CSI-RS resource configured by higher layer parameters are quasi co-located for a UE.

RRC configurations or reconfigurations including indication information associated with DTX operation include at least one of the followings:

The indication information for DL signal transmission mentioned above;

The modification period;

The Serving Cell ID or Serving Cell group ID for supporting DL signal transmission.

A timer is introduced for DTX operation. When the timer is expired, the DTX operation or DTX on duration or DTX off duration is stopped or started.

iii) A timer is introduced for DTX operation. When the timer is expired, the DTX operation or DTX on duration or DTX off duration is stopped or started.

In some embodiments, for the indication methods to indicate DTX operation as discussed above, for UE with DRX configuration, if UE is provided by the configuration of DTX, or if UE detects the indication associated with DTX operation, the UE assumes that DTX operation is performed during the next DRX cycle as shown in FIG. 8, or the UE assumes that DTX operation is performed after a delay from the detection of the indication associated with DTX operation to the end of current DRX cycle as shown in FIG. 9.

4) Fall-Back Mechanism.

If a UE is provided by the configuration of DTX operation, or a UE reports an ACK for the configuration of DTX operation, the UE or all of UEs in a cell does not detect the signaling carrying indication information for DTX operation on predefined resource, the UE shall:

assume that DTX operation or DTX on duration or DTX off duration is not available;

not perform DTX operation; or determine to or not to perform DTX operation based on the configuration of higher layer parameters associated with DTX operation.

If a UE is provided by the configuration of DTX operation and DRX operation, or a UE reports an ACK for the configuration of DTX operation, the UE or all of UEs in a cell does not detect the signaling carrying indication information for DTX operation on predefined resource, the UE shall:

perform DTX operation from the beginning of the next DRX cycle or after a delay from the end of the monitoring occasions for the detection of the signaling to the end of current DRX cycle or from the start of next/current DRX cycle n to the end of DRX cycle n+N−1; or Wherein N is the number of sequential DRX cycles which are available for DTX operation.

set the current DRX cycle or the next one or more DRX cycle as DTX cycle; or not perform DTX operation during the DTX on duration or DTX off in the current DRX cycle or the number of DRX cycle; or determine to or not to DTX operation based on the configuration of higher layer parameters associated with DTX operation.

If a UE is provided by the configuration of DTX operation, or a UE reports an ACK for the configuration of DTX operation, the UE or all of UEs in a cell does not detect the signaling carrying indication information for DTX operation on predefined resource, the UE shall keep monitoring the signaling on the next predefined resource or the UE performs DTX operation during a default DRX cycle or during a default DTX on duration or default DTX off duration or default DTX cycle.

5) UE Features.

The UE features can include at least the following:

Support of DTX operation for a UE or a group of UE or a cell or a group of cell;

Support of cell specific DTX operation.

Support of DRX cycle configured as DTX operation, or support of DTX operation applied for DRX cycle.

Support of DTX operation triggered by DCI.

Support of DTX operation triggered by a timer.

Support of DTX used for PCell or SCell or CA scenario.

Embodiments: Introduction of DTX and DRX Functions

DTX Functionalities

1) DTX is a functionality that controls DL signal/channel transmission or UL signal/channel transmission, or cell-specific activity or UE-specific activity, or periodic or aperiodic activity, or UL grant or semi-persistent scheduling or dynamic scheduling.

2) During DTX on duration, at least one of the following activities are available:

A) DL signal/channel transmission includes at least one of SSB, or SIB, or DL transmission associated with RACH procedure, or paging, or periodic or semi-persistent CSI-RS, or periodic PTRS, or DRS, or TRS, or DL Semi-Persistent Scheduling (SPS), or PDCCH with CRC scrambled by specific RNTIs, or PDSCH; wherein the specific RNTIs include at least one of C-RNTI or CS-RNTI or CI-RNTI, or INT-RNTI, or SFI-RNTI, or SP-CSI-RNTI, or TPC-PUCCH-RNTI, or TPC-PUSCH-RNTI, or TPC-SRS-RNTI, or AI-RNTI, SL-RNTI, or SLCS-RNTI or SL Semi-Persistent Scheduling V-RNTI, or SI-RNTI or MCCH-RNTI or G-RNTI or RA-RNTI or MsgB-RNTI or TC-RNTI or P-RNTI or PS-RNTI or a RNTI; or wherein the specific RNTIs belong to Type0-PDCCH CSS set, Type0A-PDCCH CSS set, Type0B-PDCCH CSS set, Type1A-PDCCH CSS set, Type2-PDCCH CSS set, Type2A-PDCCH CSS set, Type3-PDCCH CSS set, and UE-specific SS set. Or B) UL signal/channel transmission includes at least one of SRS, or UL transmission associated with RACH procedure, or RSRP/RSRQ reports, or CSI report, or HARQ-ACK feedback, or scheduling request (SR), or UL grant.

C) Cell-specific activity includes at least one of cell-specific PUSCH, CG-PUSCH, cell-specific PUCCH, SSB, cell-specific SIB, PDCCH with the CRC scrambled by group-common RNTI, cell-specific PDSCH, cell-specific antenna ports configuration, or cell-specific TDD UL/DL configuration.

Example 1: cell-specific PUSCH is e.g., PUSCH scheduled by RAR UL grant, or cell-specific MsgA PUSCH.

Example 2: cell specific PUCCH is e.g., PUCCH Format 0 and 1.

Example 3: cell-specific SIB is e.g., SIB1.

Example 4: group-common RNTI is e.g., INT-RNTI, or SFI-RNTI, or SP-CSI-RNTI, or TPC-PUCCH-RNTI, or TPC-PUSCH-RNTI, or TPC-SRS-RNTI, or SI-RNTI or MCCH-RNTI or G-RNTI or RA-RNTI or P-RNTI or PS-RNTI or a RNTI.

D) UE-specific activity includes at least one of UE-specific PUSCH, UE-specific PUCCH, PDCCH with the CRC scrambled by UE-specific RNTI, UE-specific PDSCH, DL SPS, UE-specific RS transmission, UE-specific measurement, UE-specific report.

E) Periodic activity includes periodic RS transmission, SSB, SIB, periodic CSI/RSRP/RSRQ report, periodic scheduling request, PDCCH monitoring, periodic data scheduling, semi-persistent scheduling, UL grant, or DRX. Or Example 1: periodic RS transmission is e.g., periodic CSI-RS, periodic ZP-CSI-RS, semi-persistent CSI-RS, periodic PTRS.

F) Aperiodic activity includes aperiodic CSI-RS, aperiodic ZP-CSI-RS, dynamic data scheduling, dynamic scheduling request.

G) UL grant; or

H) SPS; or

I) Dynamic scheduling.

3) During DTX off duration, at least one of the following activities are unavailable or restricted, A) PDCCH with CRC scrambled by at least one of the RNTIs: C-RNTI, CS-RNTI, CI-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI or SL Semi-Persistent Scheduling V-RNTI.

B) SSB, or SIB, or paging, or periodic or semi-persistent CSI-RS.

C) SRS, or SR, or UL grant, or HARQ-ACK feedback.

D) Report of measurement on periodic or semi-persistent CSI-RS.

E) drx-onDurationTimer or drx-InactivityTimer starts running after that start of DTX off duration.

F) drx-RetransmissionTimerDL or drx-Retransmission-TimerUL starts running after that start of DTX off duration.

G) Periodic activity includes periodic RS transmission, SSB, SIB, periodic CSI/RSRP/RSRQ report, periodic scheduling request, PDCCH monitoring, periodic data scheduling, semi-persistent scheduling, UL grant, or DRX.

4) During DTX off duration, at least one of the following activities are available:

A) Behaviors triggered by a timer including BWP switch, SCell deactivation/activation, RA procedure, search space set group switching or PDCCH skipping. Example: behaviors performed during the duration that ra-ContentionResolutionTimer or msgB-ResponseWindow is running.

B) Activities associated with DRX include at least one of the followings:

The running of drx-onDurationTimer or drx-Inactivity-Timer which starts before the start of DTX off duration.

The running of drx-RetransmissionTimerDL, drx-RetransmissionTimerUL or drx-RetransmissionTimerSL which starts before the start of DTX off duration; or a Scheduling Request is sent on PUCCH and is pending. If this Serving Cell is part of a non-terrestrial network, the DRX Active Time or DTX on duration is started after the first Scheduling Request transmission plus the UE-gNB RTT.

C) Behaviors including BWP switching during a delay, or SCell deactivation/activation during a delay, or msg1/2/3/4 for 4-step RA type, or msgA and msgB for 2-step RA type, or HARQ-ACK feedback for a scheduled data that was received by a UE, or running of timers including timers associated with BWP switching, or timers triggering SCell deactivation/activation, or timers associated with DRX operation, timers associated with search space set group switching or PDCCH skipping.

Example 1: UE assumes that RACH procedure during backoff time or triggered by PDCCH order or ongoing RACH procedure that happens before start of DTX off duration are available during DTX off duration.

Example 2: UE assumes that RACH procedure configured as SSB-based RA is available during DTX off duration.

Example 3: UE assumes that RACH procedure that the preamble index is set corresponding to the selected SSB is available during DTX off duration.

Example 4: a PDCCH indicating a new transmission addressed to the C-RNTI of the MAC entity has not been received after successful reception of a Random-Access Response for the Random-Access Preamble not selected by the MAC entity among the contention-based Random-Access Preamble.

D) SR, or UL grants.

E) Periodic report for RSRP/RSRQ, or report for CSI during DTX off duration if configured by higher layers.

F) Measurement on aperiodic CSI/RSRP/RSRQ or measurements on periodic/semi-persistent CSI/RSRP/RSRQ during DTX off duration if configured by higher layers.

5) In some examples, if a UE is provided by DTX, only DTX on duration is defined or configured for a UE. The UE assumes that the activities or configurations that are permitted/available during DTX on duration are unavailable or restricted during DTX off duration, and vice versa.

6) In some examples, if a UE is provided by DTX or a UE starts to perform DTX operations, the UE shall ignore DRX configurations or shall not perform DRX operations.

DRX Functionalities.

DRX is a functionality that:

1) controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and SL Semi-Persistent Scheduling V-RNTI. When using DRX operation, the MAC entity shall also monitor PDCCH according to requirements found in NR Rel-17. When in RRC_CONNECTED, if DRX is configured, for all the activated Serving Cells, the MAC entity may monitor the PDCCH discontinuously using the DRX operation; otherwise, the MAC entity shall monitor the PDCCH as specified in NR Rel-17.

2) Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, drx-HARQ-RTT-TimerUL, and uplinkHARQ-Mode (optional).

DRX group means that a group of Serving Cells that is configured by RRC and that have the same DRX Active Time.

When DRX is configured, the Active Time for Serving Cells in a DRX group includes the time while:

drx-onDurationTimer or drx-InactivityTimer configured for the DRX group is running;

drx-RetransmissionTimerDL, drx-RetransmissionTimerUL or drx-RetransmissionTimerSL is running on any Serving Cell in the DRX group;

ra-ContentionResolutionTimer or msgB-ResponseWindow is running;

a Scheduling Request is sent on PUCCH and is pending. If this Serving Cell is part of a non-terrestrial network, the Active Time is started after the first Scheduling Request transmission plus the UE-gNB RTT; or a PDCCH indicating a new transmission addressed to the C-RNTI of the MAC entity has not been received after successful reception of a Random-Access Response for the Random-Access Preamble not selected by the MAC entity among the contention-based Random Access Preamble.

In some examples, DTX operation as discussed above indicated by a signaling is discontinuous transmission (DTX) performed by network node. In some examples, DTX operation as discussed above indicated by a signaling is discontinuous transmissions (DTX) performed by UE. In some examples, DTX operation as discussed above indicated by a signaling is discontinuous receptions (DRX) performed by UE.

Figure 10:
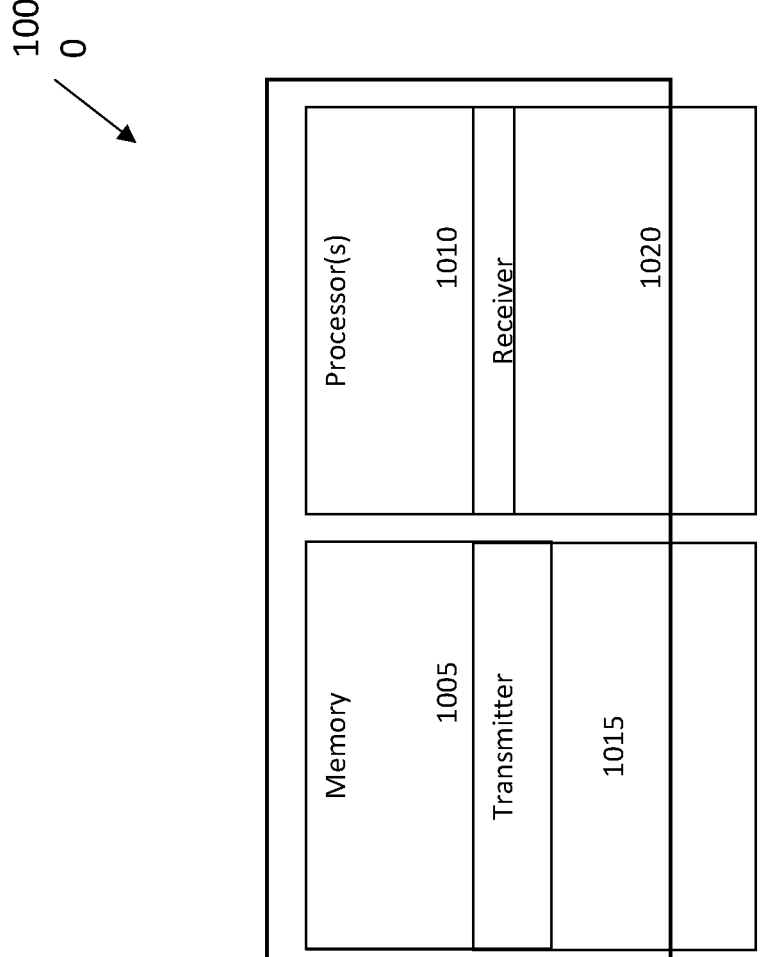
FIG. 10 shows an exemplary block diagram of a hardware apparatus figure platform that may be a part of a network device or a communication device.

FIG. 10 shows an exemplary block diagram of a hardware platform 1000 that may be a part of a network device (e.g., base station) or a communication device (e.g., a user equipment (UE)). The hardware platform 1000 includes at least one processor 1010 and a memory 1005 having instructions stored thereupon. The instructions upon execution by the processor 1010 configure the hardware platform 1000 to perform the operations described in FIGS. 1 to 9 and 11 and in the various embodiments described in this patent document. The transmitter 1015 transmits or sends information or data to another device. For example, a network device transmitter can send a message to a user equipment. The receiver 1020 receives information or data transmitted or sent by another device. For example, a user equipment can receive a message from a network device.

Figure 11:
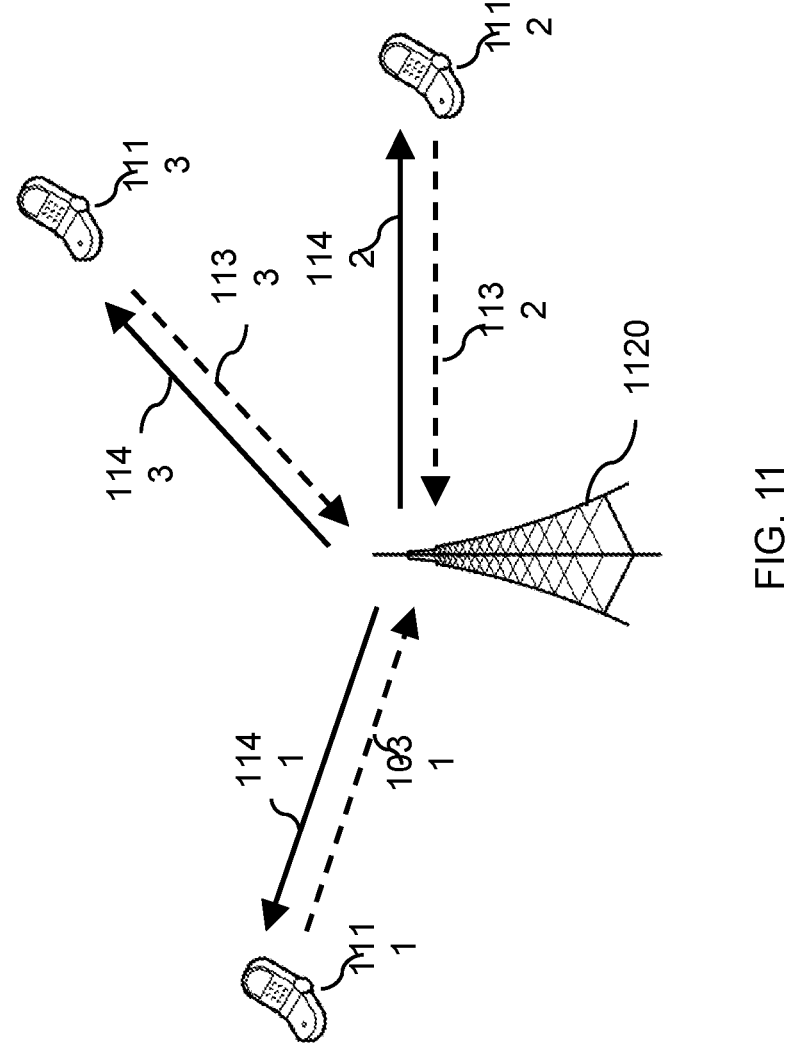
FIG. 11 shows an example of wireless communication including a base station (BS) and user equipment (UE) based on some implementations of the disclosed technology.

The implementations as discussed above will apply to a wireless communication. FIG. 11 shows an example of a wireless communication system (e.g., a 5G or NR cellular network) that includes a base station 1120 and one or more user equipment (UE) 1111, 1112 and 1113. In some embodiments, the UEs access the BS (e.g., the network) using a communication link to the network (sometimes called uplink direction, as depicted by dashed arrows 1131, 1132, 1133), which then enables subsequent communication (e.g., shown in the direction from the network to the UEs, sometimes called downlink direction, shown by arrows 1141, 1142, 1143) from the BS to the UEs. In some embodiments, the BS send information to the UEs (sometimes called downlink direction, as depicted by arrows 1141, 1142, 1143), which then enables subsequent communication (e.g., shown in the direction from the UEs to the BS, sometimes called uplink direction, shown by dashed arrows 1131, 1132, 1133) from the UEs to the BS. The UE may be, for example, a smartphone, a tablet, a mobile computer, a machine to machine (M2M) device, an Internet of Things (IoT) device, and so on.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

This application discloses an energy saving method comprising receiving, by a communication device, an indication of a discontinuous transmission (DTX) operation by a network node; and operating the communication device according to the indication of the DTX operation.

In some embodiments, the indication of the DTX operation includes identities of one or more activities that the network node turns off during the DTX operation or a pattern of on duration and off duration of the DTX operation.

In some embodiments, the activities can be periodic or aperiodic.

In some embodiments, when the pattern is an on duration, the communication device is allowed to perform at least one of the following activities: a DL signal/channel transmission, a UL signal/channel transmission, or a cell-specific activity.

In some embodiments, when the pattern is an off duration, the communication device is restricted from performing at least one of the following activities: SSB, SIB, paging, periodic CSI-RS, semi-persistent CSI-RS, SRS, SR, or UL grant, HARQ-ACK feedback, or DRX operations.

In some embodiments, when the pattern is an off duration, the communication device is allowed to perform at least one of the following activities: a behavior triggered by a timer; activities associated with DRX, or behaviors comprising messages or feedbacks received by the communication device.

In some embodiments, the behavior triggered by the timer can be performed during a duration that a ra-ContentionResolutionTimer or a msgB-ResponseWindow is running.

In some embodiments, the activities associated with DRX can be the running of a drx-RetransmissionTimerDL, a drx-RetransmissionTimerUL or a drx-RetransmissionTimerSL.

In some embodiments, the indication of DTX operation includes at least one of the following: the off duration or the availability of the off duration, the on duration or the availability of the on duration, the periodicity or the availability of the periodicity, an offset information, or a delay information.

In some embodiments, the indication of DTX operation is communicated through a signaling, wherein the signaling includes at least one of the following: a DCI, MAC CE, RRC signaling, SIB, an interaction information from another communication device, or an event.

In some embodiments, the DCI can be at least one of the following: a cell-specific signaling, a group-common signaling, or a UE specific DCI information.

In some embodiments, the DCI indication information is the cell-specific signaling or the group-common signaling, the DCI indication information can be generated in at least one of the following methods: through an information block configured to indicate a cell within a group of cells or device within a group of devices, through an information block configured to indicate a group of cells or devices, or through a bit in a bitmap configured to indicate either a cell or a group of cells, or either a device or a group of devices.

In some embodiments, when the DCI is the group-common signaling or the UE specific DCI, the information field associated with DTX operation in the DCI can be at least one of the followings: an existing field in the indication of the DTX operation, wherein the reusing is triggered by another existing field in the DCI or triggered by higher layer parameters associated with the DTX operation, or a new field in the indication of the DTX operation.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
    receiving, by a communication device from a network node, an indication of a discontinuous transmission (DTX) operation by the network node, wherein the indication of the DTX operation indicates identities of one or more activities that the network node turns off during the DTX operation and a pattern of on duration and off duration of the DTX operation; and
    operating the communication device according to the indication of the DTX operation,
    wherein when the pattern is an off duration, the communication device is restricted from performing periodic channel state information reference signal (CSI-RS), semi-persistent CSI-RS, and hybrid automatic repeat request acknowledgement (HARQ-ACK) feedback operations.

2. The method of claim 1, wherein the one or more activities can be periodic or aperiodic.

3. The method of claim 1, wherein when the pattern is an on duration, the communication device is allowed to perform at least one of the following activities: a downlink (DL) signal/channel transmission reception, a uplink (UL) signal/channel transmission, or a cell-specific activity.

4. The method of claim 1, wherein when the pattern is an off duration, the communication device is further restricted from performing at least one of the following activities: Synchronization Signal Block (SSB), System Information Block (SIB), paging, Sounding Reference Signal (SRS), Scheduling Request (SR), uplink (UL) grant, or DRX operations.

5. The method of claim 1, wherein when the pattern is an off duration, the communication device is allowed to perform at least one of the following activities: a behavior triggered by a timer; activities associated with DRX, or behaviors comprising messages or feedbacks received by the communication device.

6. The method of claim 5, wherein the behavior triggered by the timer is performed during a duration that a ra-ContentionResolutionTimer or a msgB-Response Window is running.

7. The method of claim 5, wherein the activities associated with DRX include the running of a drx-RetransmissionTimerDL, a drx-RetransmissionTimerUL or a drx-Retransmission TimerSL.

8. The method of claim 1, wherein the indication of DTX operation further indicates at least one of the following: the off duration or the availability of the off duration, the on duration or the availability of the on duration, the periodicity or the availability of the periodicity, an offset information, or a delay information.

9. The method of claim 1, wherein the indication of DTX operation is indicated by a downlink control information (DCI) for one or more communication devices, and wherein the indication of the DTX operation in the DCI is generated through an information block configured to indicate a cell.

10. The method of claim 9, wherein an information field associated with DTX operation in the DCI comprises a new field in the indication of the DTX operation.

11. An apparatus for wireless communication, comprising: at least one processor configured to implement a method, comprising:

receiving, by a communication device from a network node, an indication of a discontinuous transmission (DTX) operation by the network node, wherein the indication of the DTX operation indicates identities of one or more activities that the network node turns off during the DTX operation and a pattern of on duration and off duration of the DTX operation; and

operating the communication device according to the indication of the DTX operation, wherein when the pattern is an off duration, the communication device is restricted from performing periodic channel state information reference signal (CSI-RS), semi-persistent CSI-RS, and hybrid automatic repeat request acknowledgement (HARQ-ACK) feedback operations.

12. The apparatus of claim 11, wherein the one or more activities can be periodic or aperiodic.

13. The apparatus of claim 11, wherein when the pattern is an on duration, the communication device is allowed to perform at least one of the following activities: a downlink (DL) signal/channel transmission reception, a uplink (UL) signal/channel transmission, or a cell-specific activity.

14. The apparatus of claim 11, wherein when the pattern is an off duration, the communication device is further restricted from performing at least one of the following activities: Synchronization Signal Block (SSB), System Information Block (SIB), paging, Sounding Reference Signal (SRS), Scheduling Request (SR), uplink (UL) grant, or DRX operations.

15. The apparatus of claim 11, wherein when the pattern is an off duration, the communication device is allowed to perform at least one of the following activities: a behavior triggered by a timer; activities associated with DRX, or behaviors comprising messages or feedbacks received by the communication device.

16. The apparatus of claim 15, wherein the behavior triggered by the timer is performed during a duration that a ra-ContentionResolutionTimer or a msgB-ResponseWindow is running.

17. The apparatus of claim 15, wherein the activities associated with DRX include the running of a drx-RetransmissionTimerDL, a drx-RetransmissionTimerUL or a drx-Retransmission TimerSL.

18. The apparatus of claim 11, wherein the indication of DTX operation further indicates at least one of the following: the off duration or the availability of the off duration, the on duration or the availability of the on duration, the periodicity or the availability of the periodicity, an offset information, or a delay information.

19. The apparatus of claim 11, wherein the indication of DTX operation is indicated by a downlink control information (DCI) for one or more communication devices, and wherein the indication of the DTX operation in the DCI is generated through an information block configured to indicate a cell.

20. The apparatus of claim 19, wherein an information field associated with DTX operation in the DCI comprises a new field in the indication of the DTX operation.

* * * * *